United States Patent [19]

Mucheyer et al.

[11] Patent Number: 4,518,010

[45] Date of Patent: May 21, 1985

[54] PRESSURE CONTAINER FOR TWO HYDRAULIC CIRCUITS

[75] Inventors: Norbert Mucheyer, Rechtenbach; Heinz Schulte, Marktheidenfeld, both of Fed. Rep. of Germany

[73] Assignee: Mannesmann Rexroth GmbH, Lohr, Fed. Rep. of Germany

[21] Appl. No.: 447,625

[22] Filed: Dec. 6, 1982

[30] Foreign Application Priority Data

Jan. 21, 1982 [DE] Fed. Rep. of Germany ....... 3201790

[51] Int. Cl.³ .................... F16K 24/00; F16D 31/02
[52] U.S. Cl. ................ 137/587; 137/543.13; 137/549; 137/592; 60/413
[58] Field of Search ............ 137/572, 576, 574, 587, 137/592, 549, 539, 543, 543.13, 518.4; 60/413

[56] References Cited

U.S. PATENT DOCUMENTS

| | | | |
|---|---|---|---|
| 2,874,718 | 2/1959 | Kelly | 137/543.13 |
| 3,302,662 | 2/1967 | Webb | 137/539 |
| 3,726,310 | 4/1973 | Coscia | 137/576 |
| 4,192,337 | 3/1980 | Alderson et al. | 60/413 |
| 4,215,545 | 8/1980 | Morello et al. | 60/413 |
| 4,297,846 | 11/1981 | Cadeddu | 137/574 |
| 4,311,167 | 1/1982 | Stoves et al. | 137/549 |

OTHER PUBLICATIONS

*Olhydraulik,* Dr. Heinz Zoebl, MIT 439 Textabbildungen, Wien Springer-Verlag, 1963.

*Primary Examiner*—A. Michael Chambers
*Attorney, Agent, or Firm*—Michael J. Striker

[57] ABSTRACT

A suction container for two hydraulic circuits, particularly for a steering circuit and a control circuit has a housing lower portion closed with a cover. A suction tube is inserted into the housing lower portion, which tube is connected to a first consumer line. The container also includes connections which are in communication with a second consumer line and with a fluid supply container. During operation the suction container is under predetermined pressure. A filter device is disposed in the cover before the connection to the second consumer line. A pressure-limiting valve and a reverse valve openable into the container housing are also mounted in the cover.

8 Claims, 3 Drawing Figures

PRESSURE CONTAINER FOR TWO HYDRAULIC CIRCUITS

BACKGROUND OF THE INVENTION

The present invention relates to pressure containers in general, and particularly to a pressure container connected to two hydraulic circuits, especially to a steering circuit and a control circuit.

A pressure container or so-called after-suction container known in the art serves the purpose of receiving a pressure fluid from the steering circuit and sucking the pressure fluid back to the steering circuit in the case of loss of the pressure fluid in that circuit. Furthermore, the suction container serves as a source of the pressure fluid for a control circuit. For a straight maintenance of a predetermined pressure in the suction container there is provided a pressure-limiting valve connected to the container. A reverse valve connected to a fluid supply container and openable into the suction container makes it possible that the pressure fluid is sucked from the fluid supply container in the event that the pressure fluid from the steering circuit is withdrawn from the suction container, for example when the fluid pressure source requested from the fluid supply container drops out. The pressure fluid provided as a pressure fluid source for the control circuit and obtained from the suction container must be preliminarily refined in a filter apparatus. The arrangement of the conventional suction container including a plurality of hydraulic elements is, however, costly and furthermore requires a lot of space for installation of all the elements.

SUMMARY OF THE INVENTION

It is an object of the present invention to provide a suction container which requires less room than conventional suction containers of the type under consideration and is less expensive.

Still another object of the invention is to provide an improved suction container which is compact and troubleless.

These and other objects of the invention are attained by a pressure container for two hydraulic circuits, particularly for a steering circuit and a control circuit, comprising a lower housing portion and an upper cover closing said housing portion; a suction tube inserted into said housing portion and connectable to the first hydraulic circuit, first connection means in said cover and connectable to the second hydraulic circuit; second connection means in said cover and connectable to a pressure fluid supply container so that the pressure container during operation is under a predetermined pressure; filter means mounted in said cover before said first connection means; a pressure-limiting valve disposed in said cover and connected to said second connection means; and a reverse valve adapted to open into said housing portion and connected to said pressure-limiting valve.

In accordance with a further feature of the invention, the filter means may include a supporting sleeve partially extended into said housing portion, a hollow cylindrical filter web disposed in said housing portion and secured to said supporting sleeve, said filter web having an end facing away from said sleeve, and a bottom member mounted at said end.

Furthermore, the pressure-limiting valve may have an outlet and the reverse valve may have an inlet, the outlet of said pressure-limiting valve and the inlet of said reverse valve being connected to said second connection means.

According to still further features of the invention the pressure-limiting valve may include a valve shaft axially slidably movable in said cover and having a tapered end, said cover including a stepped opening connected to said housing portion and receiving said pressure-limiting valve and having a portion forming a shoulder which constitutes a valve seat for said tapered end.

The valve shaft may be spring-biased in that opening.

Furthermore, the reverse valve may include a spring ring and a valve ball, said spring ring forming a valve seat for said valve ball.

The cover may be formed with another opening receiving said spring ring and said valve ball. That another opening may extend normally to said first-mentioned opening and connected thereto.

Due to mounting the filter apparatus on the cover of the container costs of manufacturing filter housing will be reduced because the container housing replaces the filter housing. The pressure-limiting valve and reverse valve arranged in the container cover will not require separate housings either.

The whole structure is therefore compact and less troublesome as compared to those including separate and independent hydraulic elements.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DETAILED DESCRIPTION OF THE PREFERRED EMBODIMENTS

Figure 2:
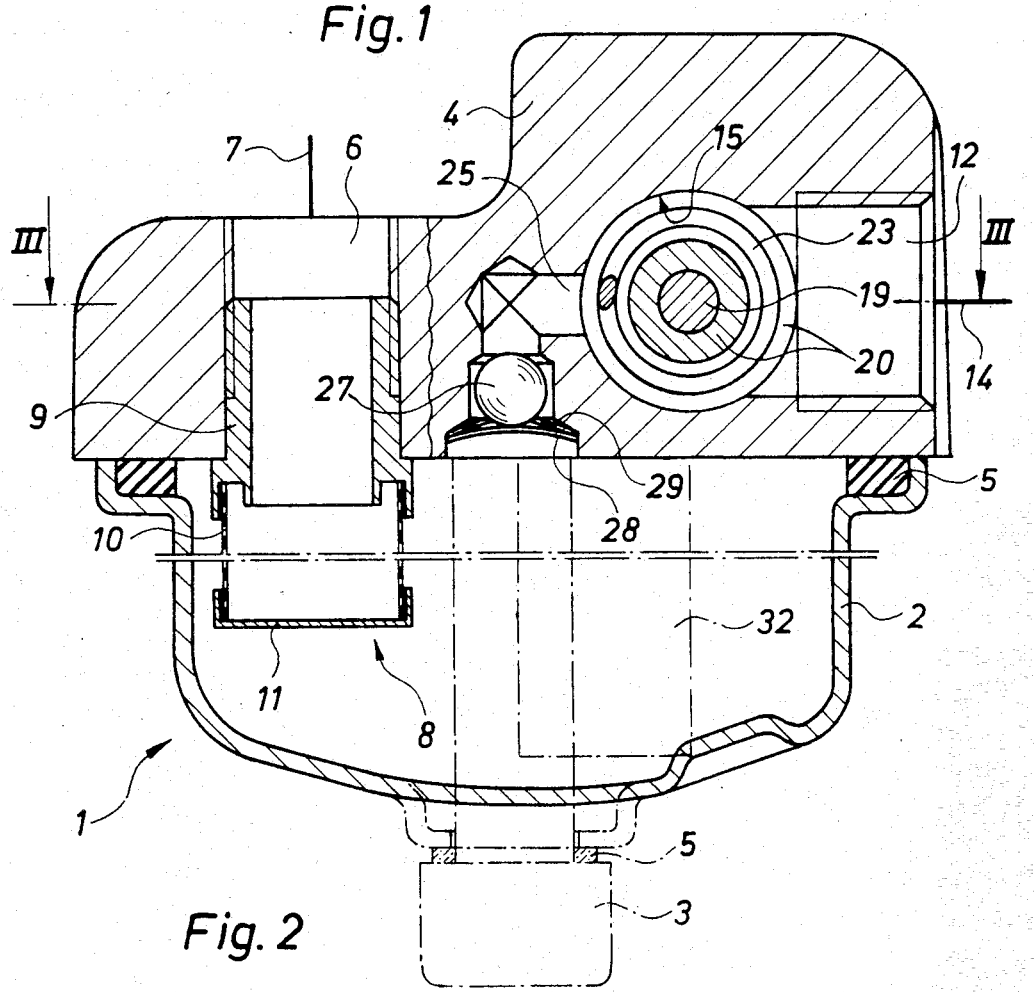
FIG. 2 is a sectional view of the suction container, along line 11—11 of FIG. 3; and, FIG. 3 is a sectional view along line III—III of FIG. 2.
Figure 3:
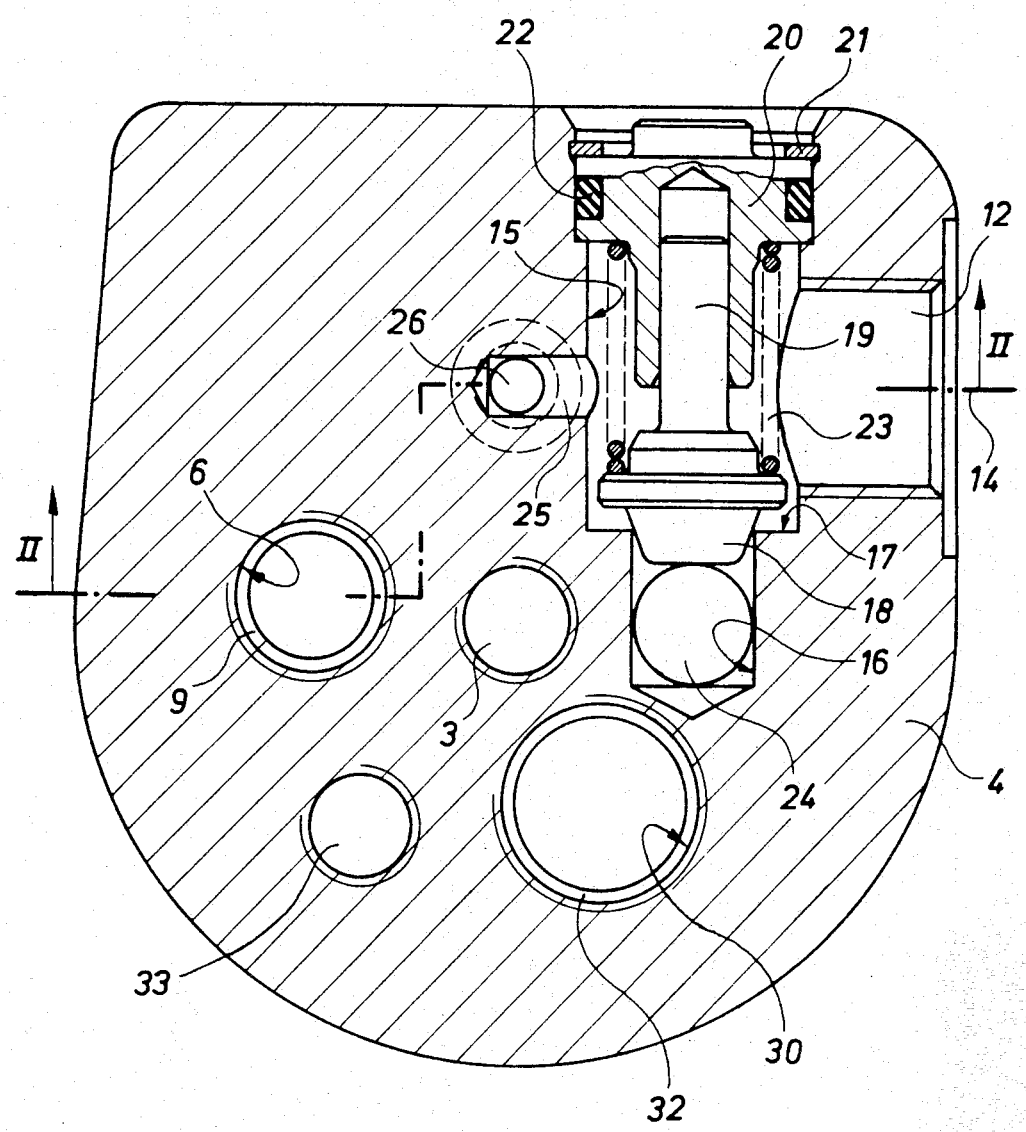

Referring now to the drawings, and first to FIGS. 2 and 3, it is seen that an after-suction container 1 is comprised of a lower portion 2 and an upper portion or cover 4 which are connected to each other by means of an anchor bolt 3, illustrated in dash-dotted lines. Anchor bolt 3 whose head is located below the lower portion 2 is inserted from below into that lower portion, passes the same and is secured with its thread into the cover 4. A seal 5 formed as an annular disc is disposed between the cover 4 and lower portion 2 of the container.

The cover 4 has a connection bore 6 connected to a control circuit 7, not illustrated in detail herein. A filter element generally designated as 8 is inserted into bore 6. The filter element 8 comprises a supporting member 9 threaded into the connection bore 6, filter web 10 fixed with its upper portion to the supporting element 9 and a bottom member 11 enclosing the filter web 10 from below. Filter web 10 can be strengthened with a reinforcing mesh or web.

Figure 1:
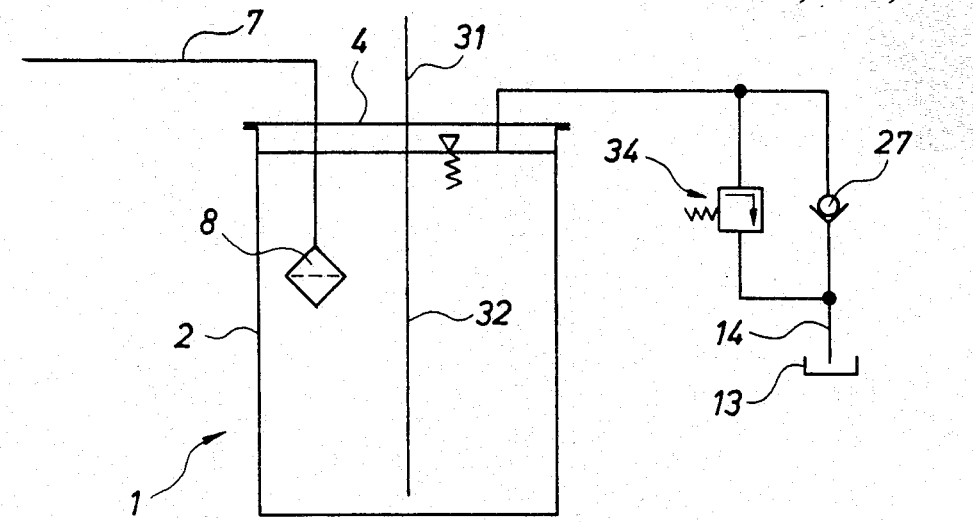
FIG. 1 is a schematic view showing connections within a hydraulic circuit in which a suction container according to the invention is enclosed.

The after-suction container according to the invention further includes a connection bore 12 formed in the cover 4 and connected to a conduit 14 leading to a fluid supply container 13 (FIG. 1). Reference is now made to FIG. 3. Transversely to the connection bore 12 there is formed a bore 15 which is accessible from outside of the container. Bore 15 clearly seen in FIG. 3 has an outer portion of a larger diameter and an inner portion 16 of a smaller diameter such that a shoulder 17 constituting a valve seat is formed at the transition between those outer and inner portions. The valve seat at the shoulder 17 cooperates with a valve member 18 having a conical end portion and a shaft portion 19, the latter being axially slidably supported in a recess of a bearing element 20. The bearing element 20 is disposed in bore 15 opposite to the shoulder 17 and is held in that bore by means of a spring ring 21 which is inserted in a groove provided in the wall forming the bore 15. The clearance between bearing element 20 and bore 15 is sealed by a seal ring 22. A valve spring 23 is clamped between the flange of the bearing element 20 and the flange of the valve 18, which spring holds the valve member against its valve seat at the shoulder 17. The inner portion 16 of bore 15 is connected to the lower portion 2 of the container via a hole 24 extended transversally to bore 15.

Coaxially to the connection bore 12 there is provided a connection bore 25 of a diameter smaller than that of bore 12, bore 25 being formed at the side of bore 15 opposite to that from which bore 12 is extended. Bore 25 in turn is connected to a stepped bore 26 which extends transversally to bore 25. Bores 25 and 12 are connected to the bore 15. A valve ball 27 is disposed in a larger part of bore 26, which opens into the lower portion 2 of the container. A free triangular spring ring 28 having a through passage for a pressure fluid is inserted in the larger part of bore 26, spring ring 28 having resilient flaps 29 which serve the purpose of shoulder forming a valve seat for the valve ball 27 to hold the latter in the bore 26. The whole arrangement is so constructed that the valve ball 27 operating as a reverse valve opens in the direction into the lower portion 2 of the container and closes in the opposite direction.

A connection bore 30 (FIG. 3) is provided in cover 4, which bore is in communication with a fly-back conduit 31 of the steering circuit. A suction tube 32 is screwed at one end thereof into the connection bore 30, suction tube 32 extending into the lower portion 2 of container 1 almost up to the bottom wall of the container. A testing connection bore 33 is formed in the vicinity of the connection bore 30.

The valve member 18, valve spring 23 and the valve seat on shoulder 17 form a pressure-limiting valve 34 schematically shown in FIG. 1.

The pressure container 1 is constantly filled with a pressure fluid. The pressure fluid admitted into the container through connection bore 30 can, in the case of the pressures exceeding a predetermined pressure, flow away through the pressure-limiting valve 34. During the fall-out, the pressure fluid source of the hydraulic circuit connected with the fluid supply container 13 is ensured by the arrangement of suction tube 32 which can suck the pressure fluid of the steering circuit out from the suction container 1. If there is a lack of the pressure fluid in the pressure container 1 the pressure fluid will be sucked from the fluid supply container 13 through the reverse valve including the valve ball 27. If the fluid supply container 13 is empty, air can be sucked into the container so that no underpressure will result in the pressure container 1.

The suction container serves also as a pressure medium source for the control circuit 7 which is connected to the container by connection bore 6. The pressure of the pressure fluid contained in the container 1 is normally between 13 bar and 15 bar. The pressure medium source for the control circuit 7 is the pressure fluid-back stroke from the steering circuit 31. When the pressure medium source of the hydraulic circuit fails, it is insured due to the suction container according to the invention that the steering circuit is continuously supplied with the pressure fluid.

It will be understood that each of the elements described above, or two or more together, may also find a useful application in other types of pressure container for two hydraulic circuits, differing from the types described above.

While the invention has been illustrated and described as embodied in a pressure container for two hydraulic circuits, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An after-suction pressure fluid container for two hydraulic circuits, particularly for a steering circuit and a control circuit, comprising a lower hollow housing portion and an upper cover closing said housing portion; a suction tube inserted into said housing portion and connectable to one of said hydraulic circuits; first connection means in said cover and connectable to the other of said circuits; second connection means in said cover and connectable to a pressure fluid supply container; a pressure-limiting valve connected to said second connection means and operated so that the pressure fluid container during operation is under predetermined pressure; filter means mounted in said cover and immediately before said first connection means; said pressure-limiting valve being connected to said second connection means; and a check valve which opens into an interior of said housing portion, said pressure-limiting valve and said check valve being mounted in said cover.

2. The container as defined in claim 1, wherein said filter means includes a supporting sleeve partially extended into said housing portion at said first connection means, a hollow cylindrical filter web disposed in said housing portion and secured to said supporting sleeve, said filter web having an end facing away from said sleeve, and a bottom member mounted at said end.

3. The container as defined in claim 2, said pressure-limiting valve having an outlet and said check valve having an inlet, the outlet of said pressure-limiting valve and the inlet of said reverse valve being connected to said second connection means.

4. The container as defined in claim 3, wherein said pressure-limiting valve includes a valve shaft axially slidably movable in said cover and having a tapered end, said cover including a stepped opening connected to said housing portion and receiving said pressure-limiting valve and having a portion forming a shoulder which constitutes a valve seat for said tapered end.

5. The container as defined in claim 4, wherein said valve shaft is spring-biased in said opening.

6. The container as defined in claim 5, wherein said check valve includes a spring ring and a valve ball, said spring ring forming a valve seat for said valve ball.

7. The container as defined in claim 6, wherein said cover is formed with another opening receiving said spring ring and said valve ball.

8. The container as defined in claim 7, wherein said another opening extends normally to said first mentioned opening and is connected thereto.

* * * * *